United States Patent [19]
Fukahori et al.

[11] Patent Number: 5,451,454
[45] Date of Patent: Sep. 19, 1995

[54] HIGH-MOLECULAR MATERIALS AND PROCESSES FOR MANUFACTURING THE SAME

[75] Inventors: Yoshihide Fukahori; Naruhiko Mashita; Akihiko Ogino, all of Tokyo; Shinichi Toyosawa, Saitama; Takeshi Ohba; Yasushi Imai, both of Tokyo, all of Japan

[73] Assignee: Bridgestone Corporation, Tokyo, Japan

[21] Appl. No.: 990,248

[22] Filed: Dec. 14, 1992

[30] Foreign Application Priority Data

Dec. 24, 1991 [JP] Japan .................... 3-341049
Jan. 20, 1992 [JP] Japan .................... 4-7423
Jan. 20, 1992 [JP] Japan .................... 4-7424

[51] Int. Cl.⁶ .............. C08K 5/10; B32B 3/26
[52] U.S. Cl. .............. 428/318.4; 428/321.1; 521/52; 521/61; 521/65; 521/142; 524/502
[58] Field of Search .......... 428/304.4, 318.4, 320.2, 428/321.1; 521/52, 61, 65, 142; 524/502

[56] References Cited

U.S. PATENT DOCUMENTS

| | | | |
|---|---|---|---|
| 3,450,650 | 6/1969 | Murata | 521/61 |
| 4,188,432 | 2/1980 | Holden et al. | 428/517 |
| 4,197,148 | 4/1980 | Shinomura | 156/79 |
| 4,620,955 | 11/1986 | Kono et al. | 264/41 |
| 4,919,992 | 4/1990 | Blundell et al. | 428/131 |
| 5,225,471 | 7/1993 | Tajima et al. | 524/284 |

FOREIGN PATENT DOCUMENTS 0419170 3/1991 European Pat. Off. .

Primary Examiner—George F. Lesmes
Assistant Examiner—Blaine R. Copenheaver
Attorney, Agent, or Firm—Kanesaka & Takeuchi

[57] ABSTRACT

A blend of high-molecular and a low-molecular organic material contains the high-molecular organic material in a proportion smaller than that of the low-molecular organic material, and has a three-dimensionally continuous network skeleton structure formed by the high-molecular organic material. The structure preferably has an average cell or mesh diameter not exceeding 500 microns. The removal of the low-molecular organic material from the blend gives a functional porous material consisting of the high-molecular organic material. The replacement of the low-molecular organic material in the blend with a solid or liquid, or a mixture thereof, gives a functional composite material containing the solid or liquid, or their mixture in the network skeleton structure.

5 Claims, 5 Drawing Sheets

100 μ

HIGH-MOLECULAR MATERIALS AND PROCESSES FOR MANUFACTURING THE SAME

BACKGROUND OF THE INVENTION

1. Field of the Invention

This invention relates to a high-molecular blend, a functional porous material and a process for manufacturing the same, and a functional composite material and a process for manufacturing the same.

2. Description of the Related Art

There are known porous materials, such as polyurethane or other plastic foams, and sponge, which are manufactured by foaming the raw materials by a reaction forming cells, or by employing a foaming agent, or $N_2$ or $CO_2$, or by mechanical stirring. Although these materials can be manufactured by simple processes, the cells formed by foaming are considerably large, and it is difficult to form microscopic cells.

There are also known functional separation membranes which are manufactured by stretching (e.g. GORE-TEX®), by a physical method, by making holes by etching, by adding a soluble substance and dissolving it away, or by employing a nonwoven fabric. All of these materials have a fairly microscopic porous structure, but have the drawbacks of being low in uniformity and porosity.

It is well known that the morphology of a blend of different substances depends on the proportions in quantity of the blended substances, their compatibility, the blending conditions, etc. Referring, for example, to the proportions in quantity, it is often the case that both of two components I and II of a blend form continuous phases if their proportions in quantity are substantially equal, as shown in FIG. 3. If, on the other hand, one of the components I has a significantly greater proportion, it is very likely that the component I may form a continuous phase, while the minor component II is scattered in discontinuous phases, as shown in FIG. 4. This is particularly the case when the component I has a proportion of 70% or more, while the component II has a proportion of 30% or less. This tendency coincides well with the fact that balls filling a cube cannot occupy more than 74% of its volume.

As a matter of fact, there is literature containing the following statement ("'Polymer Alloys'—Fundamentals and Applications", Edited by The Society of High-Molecular Substances, and Published by Tokyo Kagaku Dojin, page 380):

"A component having a high volume percentage tends to form an ocean phase. A component having a volume percentage of 75% or more forms an ocean phase, while a component having a volume percentage of 25% or less forms an island phase, irrespective of any other conditions. The phase formed by a component having a volume percentage of 25 to 75% depends on the blending conditions."

The morphology of a blend, of course, depends largely on the compatibility of its components, too. The higher their compatibility, the more likely it is that the microscopic separation of phases may occur, and the more likely it is that even a component having a relatively small volume proportion may form a continuous phase. If, on the other hand, their compatibility is very low (as in a mixture of water and oil), their mixture shows a considerable microscopic phase separation if it is strongly stirred, but their phase separation is very unstable and changes to a macroscopic one with the passage of time.

Anyway, it is generally difficult to form a stable three-dimensional continuous phase from a minor component having a volume percentage of 25% or less in its blend with a major component having a volume percentage of 75% or more.

It is generally true that a minor component dispersed as discontinuous (island) phases in a major component can hardly exhibit its desirable properties, since they are hidden behind the properties of the major component. It is, therefore, most advisable to establish a system in which the minimum possible amount of a minor component is uniformly distributed to form a three-dimensionally continuous network skeleton structure, so that a major component may exhibit its desirable properties to the maximum possible extent, while the minor component makes up the undesirable properties, or drawbacks of the major component. In a mixed system containing 25% or less of a minor component and 75% or more of a major component, however, it is difficult to form a stable three-dimensionally continuous phase of the minor component, since the minor component generally tends to be scattered and form discontinuous phases, as hereinabove described. It is impossible to form a three-dimensionally continuous network skeleton structure of the minor component, except in very rare cases. Moreover, it has hitherto been difficult to obtain porous materials having microscopic cells and the conventionally available functional separation membranes have the drawbacks of being low in the uniformity of their porous structure, and in porosity, as hereinabove pointed out.

If it is possible to prepare a disperse system in which the minimum possible amount of a minor component forms discontinuous (island) phases in a major component and is uniformly distributed to form a three-dimensionally continuous network skeleton structure, the removal of the major component from the system makes it possible to obtain a functional porous material having a three-dimensionally continuous network skeleton structure formed by the minor component. It is, however, difficult to form a three-dimensionally continuous phase of a minor component, since it generally tends to form discontinuously scattered phases, as hereinabove stated. As a matter of fact, there has hitherto not been provided any mixed system containing a minor component forming a three-dimensionally continuous phase.

OBJECTS AND SUMMARY OF THE INVENTION

Under these circumstances, it is an object of this invention to provide a high-molecular blend weight or blended material consisting of a mixture of a high-molecular weight or first organic material and a low-molecular weight or second organic material in which the high-molecular organic material is a minor component forming a three-dimensionally continuous network skeleton structure and makes up the drawbacks of the low-molecular organic material, while allowing it to retain its properties, and which has properties improved drastically by the combined effect of the high- and low-molecular organic materials.

It is another object of this invention to provide a functional porous material which has microscopic and uniform cells, is of high porosity, and is, therefore, useful for a wide range of industrial application, and a process for manufacturing the same.

It is still another object of this invention to provide a functional composite material in which a high-molecular weight or first organic material used as a minor component forms a three-dimensionally continuous network skeleton structure in which another material is dispersed, so that the high-molecular organic material may make up the drawbacks of the other material, while allowing it to retain its properties, and which has properties improved drastically by the combined effect of the high-molecular organic material and the other material, and a process for manufacturing the same.

According to this invention, therefore, there is provided a high-molecular blend weight or a blended material which consists mainly of a high-molecular weight or first organic material and a low-molecular weight or second organic material, and contains the high-molecular organic material in a smaller proportion than the low-molecular organic material, and in which the high-molecular organic material has a three-dimensionally continuous network skeleton structure.

The high-molecular organic material forming a minor component of the blend has a number-average molecular weight of 20,000 or more and the low-molecular organic material forming a major component thereof has a number-average molecular weight of less than 20,000. The two components are mixed under such conditions that the major component may be distributed in the three-dimensionally continuous network skeleton structure formed by the minor component.

The major component can fully exhibit its properties and its drawbacks can be made up by the three-dimensionally continuous network structure of the minor component. Therefore, the combined effect of the two components imparts drastically improved properties to the blend and thereby makes it useful for a wide range of industrial application.

The most important factor that is required of the high-molecular blend of this invention is to ensure that the high-molecular organic material form a stable three-dimensionally continuous network skeleton structure very effectively, even though it is used as the minor component. It is, therefore, essential to make an appropriate selection of the high- and low-molecular organic materials and the mixing conditions which are employed for preparing the blend.

According to this invention, there is also provided a functional porous material which comprises a high-molecular weight or first material having a three-dimensionally continuous network skeleton structure of which the mesh openings have an average diameter not exceeding 500 microns.

The functional porous material of this invention can be manufactured by a process which comprises mixing a high-molecular organic material and a low-molecular organic material in an amount larger than that of the high-molecular organic material to prepare a precursor having a three-dimensionally continuous network skeleton structure formed by the high-molecular organic material, and removing the low-molecular organic material from the precursor.

The functional porous material of this invention is very useful for a wide range of industrial application due to its three-dimensionally continuous network skeleton structure having a very small mesh size. For example, it is useful for making a high-performance separation membrane for dialysis, ultrafiltration, reverse osmosis, ion exchange or gas separation, or for a biosensor. It can also be used to make an inkpad, or contact lenses having a long life if it is impregnated with an appropriate aqueous solution, or organic liquid. Moreover, its porosity makes it useful as a sound-absorbing material.

According to this invention, there is further provided a functional composite material which comprises a high-molecular material forming a three-dimensionally continuous network skeleton structure having an average mesh or cell diameter not exceeding 500 microns, and a solid and/or liquid held in the network structure formed by the high-molecular material.

The functional composite material of this invention can be manufactured by a process which comprises mixing a high-molecular organic material and a low-molecular organic material in an amount larger than that of the high-molecular organic material to prepare a precursor having a three-dimensionally continuous network skeleton structure formed by the high-molecular organic material, and replacing the low-molecular organic material in the precursor by another material, or materials.

The solid and/or liquid which is employed as a major component can fully exhibit its desirable properties, while its drawbacks are made up by the three-dimensionally continuous network structure formed by the high-molecular organic material employed as a minor component. The functional composite material of this invention, therefore, exhibits outstandingly good properties owing to the combined effect of the two components thereof, and is useful for making a wide range of products in a wide variety of fields of industry.

The functional porous or composite material of this invention can easily be manufactured by employing the high-molecular blend of this invention. A high-molecular organic material having a number-average molecular weight of 20,000 or more is used as a minor component, and a low-molecular organic material having a number-average molecular weight of less than 20,000 is used as a major component. The two components are mixed under specific conditions to prepare as a precursor a high-molecular blend in which the low-molecular organic material is dispersed in a three-dimensionally continuous network skeleton structure formed by the high-molecular organic material. If the low-molecular organic material is removed from the precursor, there is obtained a functional porous material. If the low-molecular organic material is replaced by another solid and/or liquid material, there is obtained a functional composite material containing the solid and/or liquid material in the network structure formed by the high-molecular organic material. When the precursor is prepared, it is essential to select the high- and low-molecular organic materials and the mixing conditions appropriately to ensure that the high-molecular organic material forms a stable three-dimensionally continuous network skeleton structure very effectively, even though it may be used as a minor component.

DETAILED DESCRIPTION OF THE INVENTION

Figure 1:
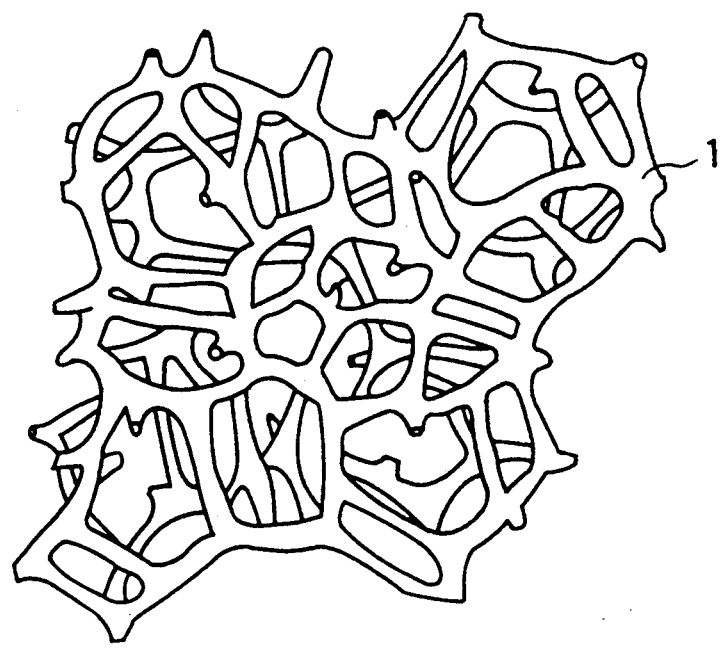
FIG. 1 is a schematic perspective view of a three-dimensionally continuous network skeleton structure formed by a high-molecular organic material in a high-molecular blend, or functional porous, or composite material embodying this invention.

The high-molecular blend of this invention comprises a high-molecular organic material as a minor component and a low-molecular organic material as a major component, hereinafter referred to occasionally as "components A and B", respectively, and will, therefore, be referred to occasionally as the "A/B blend".

Component A is a high-molecular organic material having a number-average molecular weight of at least 20,000, preferably at least 30,000, and more preferably at least 40,000. Specific examples thereof includes thermoplastic elastomers composed of styrene, vinyl chloride, olefin, polyester, polyamide and urethane, and hydrogenated or otherwise modified products thereof, more specifically, thermoplastic resins such as polystyrene, polyethylene, polypropylene, ABS, polyvinyl chloride, polymethyl methacrylate, polycarbonate, polyacetal, nylon, polyether chloride, polytetrafluoroethylene, polyfluorochloroethylene, polyfluoroethylene-propylene, acetyl cellulose, ethyl cellulose, polyvinylidene, vinyl butyral and polypropylene oxide, and rubber-modified products thereof. It is usual to use one of these thermoplastic materials alone, though it is also possible to use a mixture of two or more materials.

Component B is a low-molecular organic material having a number-average molecular weight of less than 20,000, preferably less than 10,000, and more preferably less than 5,000. Although there is no particular limitation to the material which can be employed, the following is a list of examples of appropriate materials:

(1) Softening agents

Aromatic, naphthenic and paraffinic softening agents for rubbers or resins;

(2) Plasticizers

Plasticizers composed of esters including phthalic, mixed phthalic, aliphatic dibasic acid, glycol, fatty acid, phosphoric and stearic esters, epoxy plasticizers, other plasticizers for plastics, and phthalate, adipate, sebacate, phosphate, polyether and polyester plasticizers for NBR;

(3) Tackifiers

Coumarone resins, coumarone-indene resins, terpene phenol resins, petroleum hydrocarbons and rosin derivatives;

(4) Oligomers

Crown ether, fluorine-containing oligomers, polybutenes, xylene resins, chlorinated rubber, polyethylene wax, petroleum resins, roson ester rubber, polyalkylene glycol diacrylate, liquid rubber (polybutadiene, styrenebutadiene rubber, butadiene-acrylonitrile rubber, polychloroprene, etc.), silicone oligomers, and poly-α-olefins;

(5) Lubricants

Hydrocarbon lubricants such as paraffin and wax, fatty acid lubricants such as higher fatty acid and hydroxy-fatty acid, fatty acid amide lubricants such as fatty acid amide and alkylene-bis-fatty acid amide, ester lubricants such as fatty acid-lower alcohol ester, fatty acid-polyhydric alcohol ester and fatty acid-polyglycol ester, alcoholic lubricants such as fatty alcohol, polyhydric alcohol, polyglycol and polyglycerol, metallic soaps, and mixed lubricants; and (6) Petroleum hydrocarbons Synthetic terpene resins, aromatic hydrocarbon resins, aliphatic hydrocarbon resins, aliphatic cyclic hydrocarbon resins, aliphatic or alicyclic petroleum resins, aliphatic oraromatic petroleum resins, polymers of unsaturated hydrocarbons, and hydrogenated hydrocarbon resins.

Other appropriate low-molecular organic materials include latexes, emulsions, liquid crystals, bituminous compositions, clays, natural starch, sugars, inorganic silicone oil, and phosphazenes. One or more materials are used as component B.

The high-molecular blend of this invention may further contain a filler. The filler can be selected from among, for example, a flaky inorganic filler such as clay, diatomaceous earth, carbon black, silica, talc, barium sulfate, calcium or magnesium carbonate, metal oxides, micas, graphite or aluminum hydroxide; a granular or powdery solid filler such as metal powders, wood chips, glass powder, ceramic powder, or a granular or powdery polymer; and natural or artificial short or long fibers such as straw, hair, or glass, metal or polymer fibers.

Figure 2:
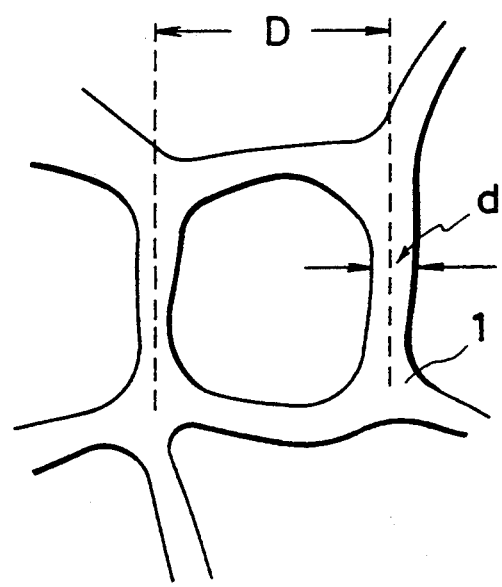
FIG. 2 is an enlarged view of a part of FIG. 1.
Figure 3:
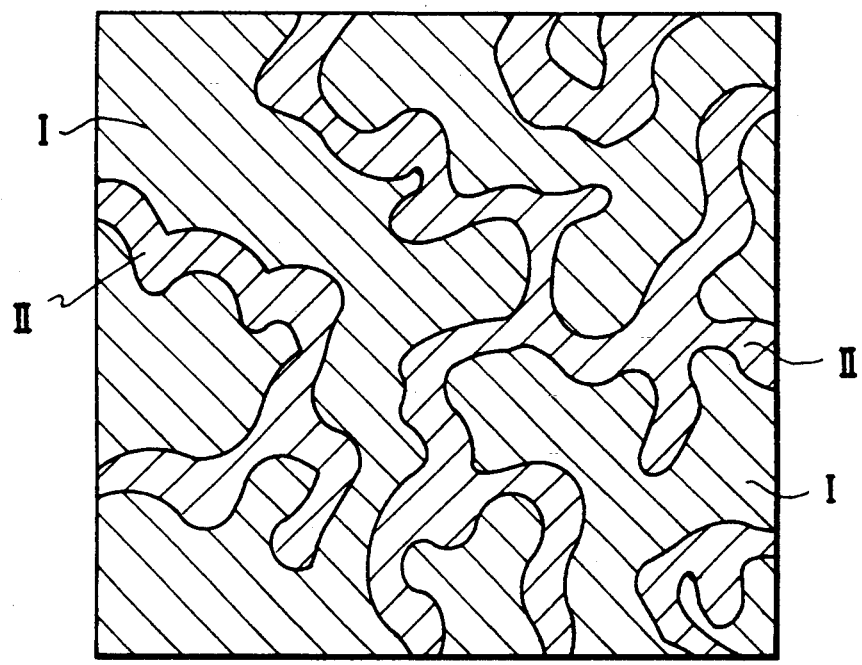
FIG. 3 is a schematic sectional view of a mixture of materials showing its morphology.
Figure 4:
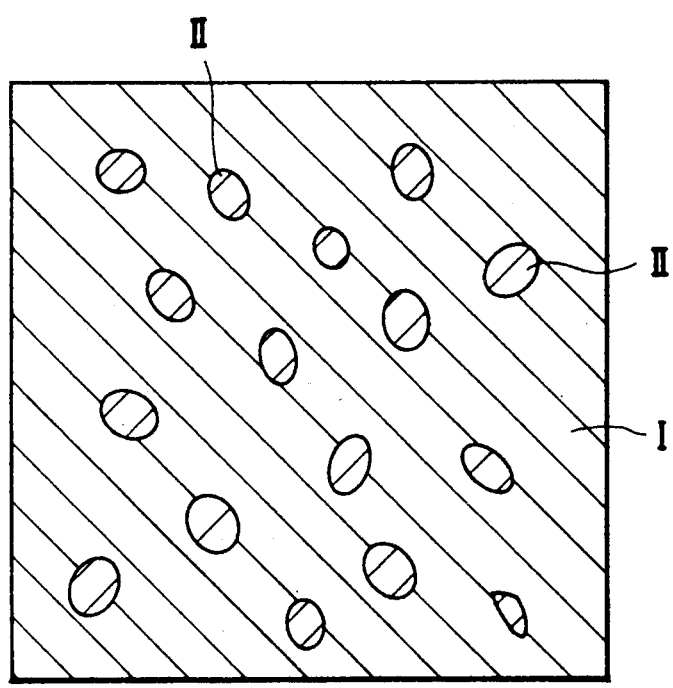
FIG. 4 is a schematic sectional view of another mixture showing its morphology.

The high-molecular blend of this invention has a three-dimensionally continuous network skeleton structure 1 formed by the high-molecular organic material in which the major component, or low-molecular organic material is dispersed, as shown in FIG. 1. Referring to FIG. 2, the network skeleton structure 1 has an average skeleton diameter d not exceeding 50 microns, preferably not exceeding 20 microns, and more preferably not exceeding 10 microns, and an average cell or mesh diameter D not exceeding 500 microns, preferably not exceeding 200 microns, and more preferably not exceeding 100 microns.

The high-molecular blend of this invention can easily be manufactured by a process which will hereinafter be described. It is so manufactured that its component A may occupy a proportion by volume of not more than 30%, preferably not more than 25%, more preferably not more than 20%, and still more preferably not more than 15%, as will hereinafter be described in further detail.

The high-molecular blend of this invention has drastically improved properties owing to the combined effect of the high- and low-molecular organic materials, as it retains the desirable properties of the low-molecular organic material, while the high-molecular organic material makes up the drawbacks of the low-molecular organic material. It is a novel high-molecular blend which possesses all of properties hitherto not obtained at a time, and is, therefore, useful for a drastically widened range of industrial application.

Referring now to the functional porous material of this invention, it has a three-dimensionally continuous network skeleton structure formed by a high-molecular organic material, as shown at 1 in FIG. 1, and having an average mesh or cell diameter D (FIG. 2) not exceeding 500 microns, preferably not exceeding 300 microns and more preferably not exceeding 200 microns. The structure 1 may be formed by any high-molecular organic material employed as component A in the high-molecular blend of this invention as hereinabove described, and has an average skeleton diameter d(FIG. 2) not exceeding 50 microns, preferably not exceeding 30 microns, and more preferably not exceeding 20 microns.

The functional porous material of this invention can easily be manufactured by a process which will hereinafter be described. It is manufactured from a blend of high- and low-molecular organic materials (components A and B, respectively) in which component A occupies a proportion by volume not exceeding 30%, preferably not exceeding 25%, more preferably not exceeding 20% and still more preferably not exceeding 15%, so that it may have a porosity of at least 70%, preferably at least 75%, more preferably at least 80% and still more preferably at least 85%.

It is preferable to employ as component A a material having both portions forming hard blocks having e.g. a crystalline or aggregate structure, and portions forming soft blocks having e.g. an amorphous structure. Examples of the preferred materials include a block copolymer of polyethylene and an ethylene-styrene random copolymer which is obtained by hydrogenating a block copolymer of polybutadiene and a butadiene-styrene random copolymer, a block copolymer of polybutadiene and polystyrene, and a block copolymer of polyethylene and polystyrene which is obtained by hydrogenating a block copolymer of polybutadiene and polystyrene. The block copolymer of polyethylene and an ethylene-styrene random copolymer are, among others, preferred.

The functional porous material of this invention has uniformly formed microscopic cells and yet is of high porosity, and is, therefore, useful for a wide range of industrial application, including the manufacture of separation membranes.

Description will now be made of the functional composite material of this invention. It comprises a high-molecular organic material (component A) forming a three-dimensionally continuous network skeleton structure, as shown at 1 in FIG. 1, and a solid and/or liquid material (component C) held therein, and will, therefore, be referred to occasionally as the "A/C composite". The structure 1 has an average cell or mesh diameter D (FIG. 2) not exceeding 500 microns, preferably not exceeding 300 microns, and more preferably not exceeding 200 microns, and an average skeleton diameter d(FIG. 2) not exceeding 50 microns, preferably not exceeding 30 microns, and more preferably not exceeding 20 microns.

It is preferable to use as component A a high-molecular organic material having both portions forming hard blocks having e.g. a crystalline or aggregate structure and soft blocks having e.g. an amorphous structure, though it is also possible to use any other material that has hereinbefore been shown as component A.

The network skeleton structure formed by component A makes up the drawbacks of component C. If component C is a liquid, it has the drawbacks of having no independent shape and being difficult to handle. If it is a powder, or granular material, it has the drawbacks of having no independent shape and being difficult to employ in a proportion by volume in excess of 70% to form with another solid a mixture having an independent shape. If it is a material which is a solid at ordinary room temperature, the network skeleton structure improves the mechanical properties, such as brittleness, elongation and strength, of component C, as well as its electrical and optical properties.

The following is a description showing a variety of examples of application of the functional composite material according to this invention as classified by materials employed as component C. It is, however, to be understood that the following is not intended for precluding the use of any other material as component C:

(1) Examples in which a material which is a liquid at ordinary room temperature is used as component C If an organic or inorganic electrolyte is used as component C, the composite material of this invention provides a semi-solid electrolyte which can be used for making a paper battery, electrochromic device, etc. The A/C composite containing a plating solution as component C enables dry plating if it is interposed between a material to be plated and a material not to be plated. If a liquid crystal is used as component C, there is obtained a light regulating material which can be used in a liquid crystal display, blind having a variable transparency to light, etc. If a magnetic fluid is used as component C, there is obtained a material for a flexible magnet, clean sealing, etc. If an electroviscous fluid is employed, there is obtained a material which can be used in a variety of vibration-damping devices. If component C consists of two organic materials $C_1$ and $C_2$ which are reactive with each other, and if they are employed for making an $A/C_1$ composite and an $A/C_2$ composite, respectively, and are brought into intimate contact with each other, their reaction forms a $C_1/C_2$ composite reinforced by the network skeleton of component A. This composite can be used in a two-component reactive adhesive for dry bonding, two-component reactive paint, etc.

(2) Examples in which a-material which is a solid (including a powder, or granular material) at ordinary room temperature is used as component C Polymers are typical of the materials which can effectively be employed under these circumstances. It is possible to use as component C, for example, an electrically conductive polymer such as polyaniline, polypyrrole or polyacetylene, a polymer prepared from a material of the phthalocyanine series and having a photoelectric transducing property, or a water-absorbing polymer such as chitin, chitosan, acrylic polymer or PVA (polyvinyl alcohol), and obtain A/C composites having different properties owing to the polymers employed. It is also effective to use as component C a ceramic material having piezoelectric property, such as barium titanate or zinc zirconate, or one having the property of absorbing light, such as titanium oxide, an electrically conductive, or magnetic metal, or an electrically conductive, gas-adsorbing or deodorizing powder, such as of carbon. Moreover, the use of a common thermoplastic or thermosetting high-molecular or organic material as component C gives a composite material in which the material used as component C has improved properties, including impact resistance, strength and elongation.

Two mutually reactive organic materials can be separately microcapsulated to form $A/C_1$ and $A/C_2$ composites which allow the two materials $C_1$ and $C_2$ to react with each other under specific conditions (e.g. at a high temperature, or pressure). If a medicine, or perfume is employed as component C, there can be produced a gradually and steadily effective poultice band, aromatic, deodorant, microcapsulated medicine, etc.

If a gel is used as component C, there is obtained a temperature-sensitive, or water-absorbing material.

The composite material of this invention can easily be manufactured by a process which will hereinafter be described. It can be manufactured from a precursor consisting of a blend of components A and B in which component A has a proportion by volume not exceeding 30%, preferably not exceeding 25%, more preferably not exceeding 20%, and still more preferably not exceeding 15%. The resulting composite material contains the same proportion by volume of component A as the precursor does.

The functional composite material of this invention has drastically improved properties owing to the combined effect of the high-molecular organic material employed as component A and the solid and/or liquid material as component C, since it retains the properties of component C, while component A makes up the drawbacks of component C. Therefore, it is a novel functional composite material which possesses all of properties hitherto not obtained at a time, and is useful for a greatly widened range of application in various fields of industry.

Description will now be made of the manufacture of the high-molecular blend, or functional porous or composite material according to this invention.

The high-molecular blend of this invention can be manufactured by mixing appropriately a high-molecular organic material employed as a minor component (component A) and a low-molecular organic material as a major component (component B), so that the high-molecular organic material may form a three-dimensionally continuous network skeleton structure. In this connection, it is advisable to ensure that the blend contains the minimum possible amount of the high-molecular organic material and yet has an appropriate network skeleton structure thereby formed. More specifically, it is advisable to ensure that the high-molecular organic material, or component A occupies a proportion, or percentage by volume not exceeding 30%, and preferably not exceeding 25%, in the total volume of components A and B, and yet forms a good three-dimensionally continuous network skeleton structure. The proportion by volume of component A is more preferably not more than 20%, and still more preferably not more than 15%.

It is possible to employ a filler, if required, in addition to components A and B to manufacture the high-molecular blend of this invention. The filler may, for example, be a flaky inorganic filler such as clay, diatomaceous earth, carbon black, silica, talc, barium sulfate, calcium or magnesium carbonate, metal oxides, micas, graphite or aluminum hydroxide; a granular or powdery solid filler such as metal powders, wood chips, glass powder, ceramic powder, or a granular or powdery polymer; or a filler of natural or artificial short or long fibers such as of straw or hair, or glass, metal or polymer fibers.

It is necessary to mix components A and B, and the filler if any, under appropriate conditions enabling component A to form a uniform three-dimensionally continuous network skeleton structure. More specifically, it is necessary to mix them under stirring at a high speed in the order of at least 300 rpm, preferably at least 500 rpm, and more preferably at least 1000 rpm. The use of a high-shear mixer is strongly recommended. No desired network skeleton structure can be formed if the components are mixed at a low speed by employing an ordinary roll mill, or rotor or cylinder mixer.

The A/B blend contains component B dispersed in the three-dimensionally continuous network skeleton structure formed by component A as shown at 1 in FIG. 1. The removal of component B from the blend gives the functional porous material of this invention which consists of the network skeleton structure formed by component A. The replacement of component B in the blend by another solid and/or liquid material, or component C yields the functional composite material of this invention which contains component C held in the network skeleton structure formed by component A.

The removal of component B can be accomplished by, for example, dissolving or extracting it in an organic solvent, whereafter the solvent remaining in the network structure is removed by volatilization. More specifically, it is effective to form the blend into small pieces or films and immerse them in an organic solvent. The replacement of component B by component C can be effected by, for example, filling the network structure with component C after the removal of component B as hereinabove set forth. This invention does, of course, not preclude the use of any other method for removing component B, or replacing it by component C.

It is possible to use any organic solvent for removing component B if it can readily dissolve component B, while not or sparingly dissolving component A. Examples of the solvents which can be employed, therefore, include aromatic hydrocarbons such as xylene, toluene and benzene, unsaturated aliphatic hydrocarbons such as hexene and pentene, saturated aliphatic hydrocarbons such as hexane and pentane, ketones such as acetone and methyl ethyl ketone, alcohols such as ethanol and butanol, chlorinated aliphatic hydrocarbons such as methylene chloride and chloroform, alicyclic hydrocarbons such as cyclohexanone, ethers such as dioxane and tetrahydrofuran, and esters such as butyl acetate. It is also possible to use a mixture of two or more solvents.

If component C is poorly compatible with component A, or is a solid or powder, it is difficult to impregnate or fill the network skeleton structure with component C after the complete removal of the solvent used for removing component B. In any such event, therefore, it is recommended that the solvent be allowed to remain in the network structure, and be gradually replaced by component C.

If component C is barely compatible with component A (for example, one of them is a hydrophilic material, while the other is a hydrophobic, or water-repelling one), it is very effective for improving the compatibility of the two components with each other to, for example, modify the molecules of component A, employ a blend containing a modifier, or modify the surface of the network skeleton structure with a coupling agent. It is also effective to add some surface active agent to component A or C, or both.

If component C is poorly compatible with the organic solvent employed for removing component B, it is effective to dissolve component C in another appropriate solvent and substitute its solution gradually for the solvent employed for removing component B. If component C is a solid or powder which does not melt even at a high temperature, it is effective to use a mixture of component C with a liquid, or another solid melting at a high temperature, for replacing component B.

There are, of course, other methods that can effectively be employed for replacing component B with C. The optimum method depends on the nature of component C employed.

The invention will now be described more specifically with reference to several examples thereof.

EXAMPLE 1

A high-molecular blend embodying this invention was prepared by employing a 2-block copolymer of polyethylene and an ethylene-styrene random copolymer obtained by hydrogenating a 2-block copolymer of polybutadiene and a butadiene-styrene random copolymer, and having a number-average molecular weight of 80,000 as component A, and a resin acid ester having a number-average molecular weight of 900 as component B, and mixing 12% by volume of component A and 88% by volume of component B in a high-shear mixer at a temperature of 200° C. under stirring at a rate of 3000 rpm for an hour.

Figure 5:
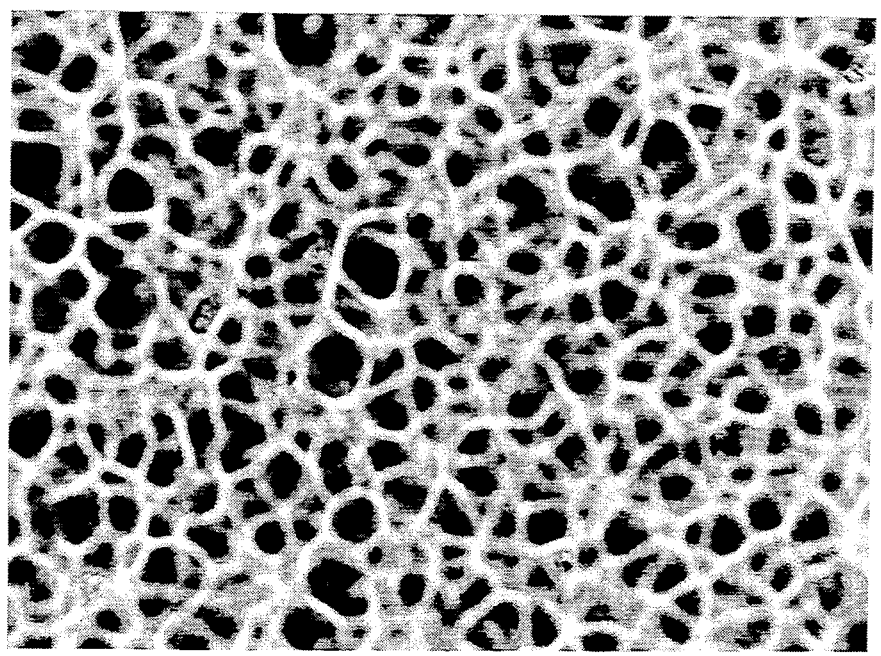
FIG. 5 is a photomicrograph showing the grain structure of a high-molecular blend according to EXAMPLE 1 which will hereinafter be described.
Figure 5:
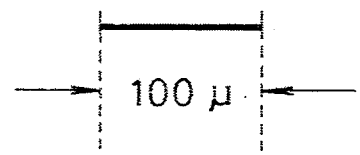

FIG. 5 is a photomicrograph showing the structure of the blend. As is obvious from FIG. 5, it had a three-dimensionally continuous network skeleton structure formed by the high-molecular organic material, or component A. The skeleton structure had an average skeleton diameter of five microns and an average cell diameter of 40 microns.

Figure 6:
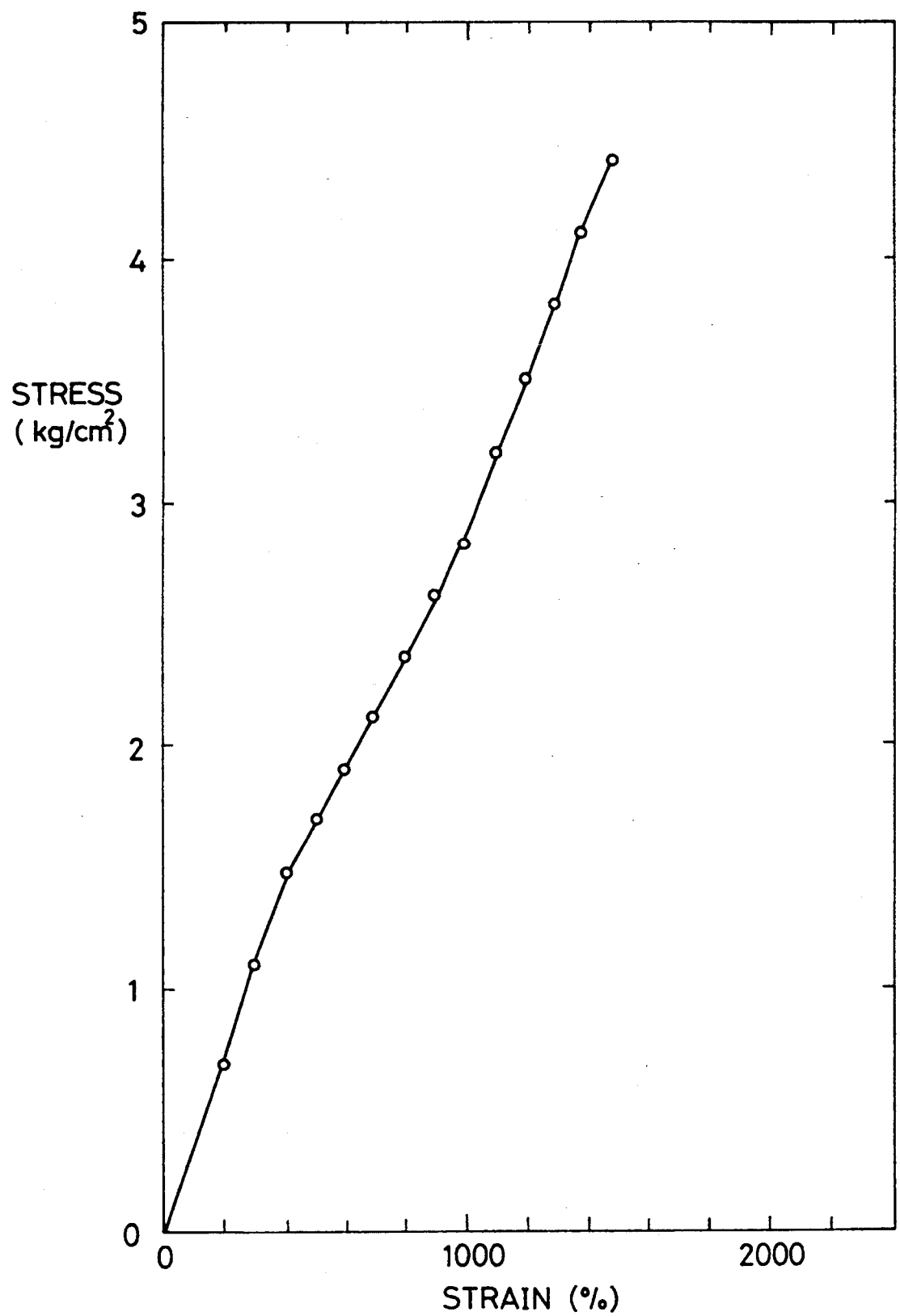
FIG. 6 is a graph showing the tensile stress-strain characteristics of the high-molecular blend according to EXAMPLE 1.

The tensile stress-strain characteristics of the blend were measured by employing a Shimadzu Autograph DIN-3, and applying stress at a rate of 300 mm per minute at a temperature of 20° C. The results are shown in FIG. 6. As is obvious therefrom, the characteristics of the blend according to this invention were like those of rubber owing to the three-dimensionally continuous network skeleton structure formed by the high-molecular organic material, which was a thermoplastic elastomer, despite the fact that the resin acid ester employed as a major component occupying 88% by volume of the blend was a viscous liquid at ordinary room temperature (20° C.).

EXAMPLE 2

The blend which had been obtained in EXAMPLE 1 was cast on a hot plate having a temperature of 200° C., and spread into a film having a thickness of about 50 microns by a bar coater. After the film had been cooled to room temperature, the procedure of immersing it in xylene and extracting its soluble component was repeated until the resin acid ester, or component B was virtually completely removed from the film, whereby there was obtained a film having a three,dimensionally continuous network skeleton structure formed by the copolymer employed as component A. The complete removal of xylene from the film by volatilization gave a functional porous material embodying this invention.

Figure 7:
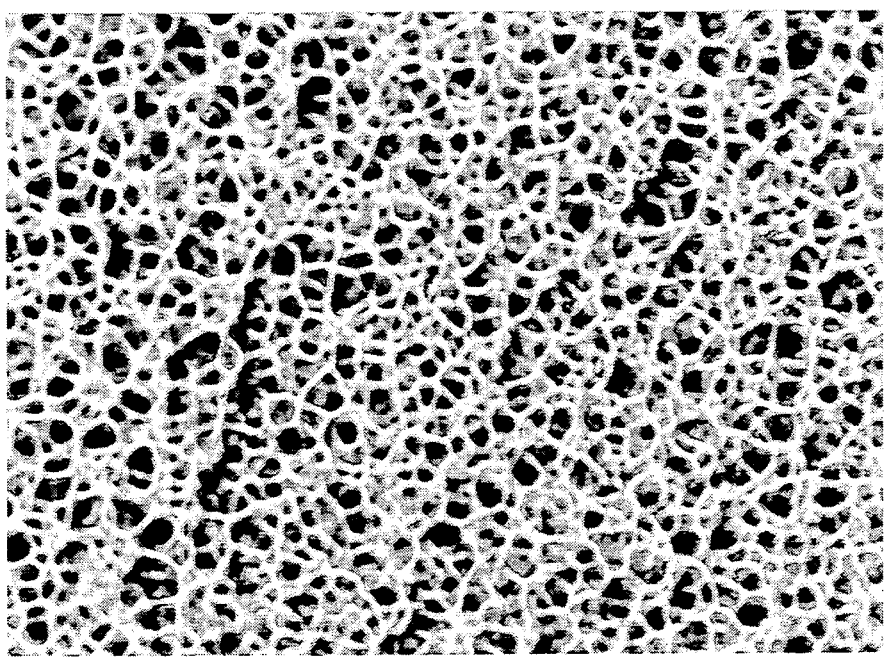
FIG. 7 is a photomicrograph showing the grain structure of a three-dimensionally continuous network skeleton formed in EXAMPLE 2 as will hereinafter be described.
Figure 7:
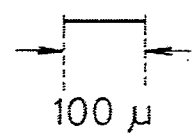

FIG. 7 is a photomicrograph showing the structure of the porous material. As is obvious therefrom, it had a three-dimensionally continuous network skeleton structure formed by the high-molecular organic material, or component A. The skeleton structure had an average skeleton diameter of five microns and an average cell diameter of 40 microns.

EXAMPLE 3

EXAMPLE 2 was repeated for preparing a film of component A having a network skeleton structure, and before the volatilization of xylene, the film was immersed in an electrolyte obtained by dissolving $LiBF_4$ in propylene carbonate, and having a concentration of one mol per liter, so that the electrolyte might replace the xylene remaining in the film, whereby there was obtained a functional high-molecular film embodying this invention and containing the electrolyte in its three-dimensionally continuous network skeleton structure.

The film was very flexible and capable of holding the electrolyte well. It had a width of 1 cm, a length of 2 cm and a thickness of 25 microns. It was sandwiched between gold electrodes and its resistance was measured by applying an electric current having a frequency of 1 kHz at 25° C. It showed a resistance of 7 ohms. A commercially available porous film of polypropylene for a separator having a thickness of 25 microns was impregnated with the same electrolyte, and its resistance was likewise measured. It showed a resistance of 20 ohms. These results confirmed the higher conductivity of the film according to this invention.

A coin-shaped battery having a thickness of 1.6 mm and a diameter of 20 mm was made by employing the film according to this invention as a separator between the cathode composed of an electrically conductive polymer known as polyaniline and the anode composed of metallic lithium. The battery showed an initial voltage of 3.4 V, an internal resistance of 21 ohms as measured at 1 kHz and 25° C., and a discharge capacity of 3.6 mAh. These results confirmed that the battery was comparable to, or even better than a coin-shaped battery including a commercially available porous film of polypropylene as a separator, and that the film according to this invention was a good battery separator.

EXAMPLE 4

A high-molecular blend was prepared by employing a 2-block copolymer of polyethylene and an ethylene-styrene random copolymer obtained by hydrogenating a 2-block copolymer of polybutadiene and a butadiene-styrene random copolymer, and having a number-average molecular weight of 100,000 as component A and an aliphatic hydrocarbon known as Exxon Chemical's "Escorez ® 1102" and having a number-average molecular weight of 1000 as component B, and mixing 12% by volume of component A and 88% by volume of component B in a high-shear mixer at a temperature of 80° C. under stirring at a rate of 6000 rpm for 45 minutes, whereby a three-dimensionally continuous network skeleton structure was formed by component A.

The blend was cast on a PET film placed on a hot plate having a temperature of 180° C., and spread into a film having a thickness of about 40 microns by a blade heated to 180° C. After the film of the blend had been removed from the hot plate, and cooled to room temperature, it was immersed in hexane and its soluble component was removed by extraction. As a result of the complete removal of component B, there was obtained a film consisting the three-dimensionally continuous network skeleton structure formed by component A.

The film was dried at room temperature under a reduced pressure, whereby hexane was completely removed by volatilization. The dry film was left to stand in a commercially available low-molecular liquid crystal produced by Chisso Co., Ltd. for a whole day and night, whereby there was obtained a functional high-molecular film embodying this invention and containing the liquid crystal filling the network skeleton structure formed by the high-molecular organic material, or component A. The film was completely opaque, but turned transparent upon application of a DC voltage of 10 V to it between a pair of sheets of electrically conductive glass.

EXAMPLE 5

A composite was prepared by mixing 10% by volume of component A and 90% by volume of component B in a high-shear mixer at a temperature of 160° C. under stirring at a rate of 4000 rpm for 75 minutes. Component A was a 2-block copolymer of polyethylene and an ethylene-styrene random copolymer obtained by hydrogenating a 2-block copolymer of polybutadiene and a butadiene-styrene random copolymer, and having a number-average molecular weight of 120,000, and component B was a polyisobutylene having a number-average molecular weight of 280 (product of Nippon Petrochemicals known as "Nisseki Polybutene").

The examination of a segment cut from the composite through an optical microscope revealed a three-dimensionally continuous network skeleton structure. The removal of the soluble component of the composite by extraction with n-hexane left the network structure intact, and it was, therefore, confirmed that the structure was composed of component A. The cells filled with component B had a diameter of 5 to 20 microns.

EXAMPLE 6

A composite was prepared by mixing 15% by volume of component A and 85% by volume of component B in a high-shear mixer at a temperature of 150° C. under stirring at a rate of 3000 rpm for 40 minutes. Component A was a 2-block copolymer of polyethylene and an ethylene-styrene random copolymer obtained by hydrogenating a 2-block copolymer of polybutadiene and a butadiene-styrene random copolymer, and having a number-average molecular weight of 110,000, and component B was a salad oil (product of Ajinomoto) employed as a softening agent composed of vegetable oil.

The examination of a segment of the composite through an optical microscope revealed a three-dimensionally continuous network skeleton structure like that shown in FIG. 5. The removal of the soluble component of the composite by extraction with n-hexane left the network structure intact, and it was, therefore, confirmed that the structure was composed of component A. The cells filled with component B had a diameter of 10 to 30 microns.

What is claimed is:

1. A blended material consisting essentially of a first organic material having a number-average molecular weight of at least 20,000 and a second organic material having a number-average molecular weight of less than 20,000, said first organic material being formed of a hard block and a soft block, said hard block having a crystalline structure and an aggregate structure and the soft block having an amorphous structure, said first organic material being at least one material selected from the group consisting of a block copolymer of polyethylene and an ethylene-styrene random copolymer which is obtained by hydrogenating a block copolymer of polybutadiene and polystyrene random copolymer; a block copolymer of polybutadiene and polystyrene; and a block copolymer of polyethylene and polystyrene which is obtained by hydrogenating a block copolymer of polybutadiene and polystyrene, said blended material containing said first organic material in a proportion of less than 30 volume percent and having a three-dimensionally continuous network skeleton structure formed by said first organic material containing said second organic material dispersed therein, said network structure having an average skeleton diameter of less than 50 microns and an average cell diameter of less than 500 microns.

2. A blended material as set forth in claim 1, wherein said first organic material is a thermoplastic one having a number-average molecular weight of at least 30,000.

3. A blended material as set forth in claim 1, wherein said second organic material is a material selected from the group consisting of softening agents, plasticizers, tackifiers, oligomers, lubricants and petroleum hydrocarbons, and having a number average molecular weight of less than 10,000.

4. A functional porous material consisting essentially of a first organic material forming a three-dimensionally continuous network skeleton structure having an average skeleton diameter of less than 50 microns and an average cell diameter of less than 500 microns, said first organic material having a number-average molecular weight of at least 20,000 and being formed of a hard block and a soft block, said hard block having a crystalline structure and an aggregate structure and the soft block having an amorphous structure, said first organic material being at least one material selected from the group consisting of a block copolymer of polyethylene and an ethylene-styrene random copolymer which is obtained by hydrogenating a block copolymer of polybutadiene and polystyrene random copolymer; a block copolymer of polybutadiene and polystyrene; and a block copolymer of polyethylene and polystyrene which is obtained by hydrogenating a block copolymer of polybutadiene and polystyrene, said network skeleton having a porosity of more than 70%.

5. A functional composite material consisting essentially of a first organic material forming a three-dimensionally continuous network skeleton structure having an average skeleton diameter of less than 50 microns and an average cell diameter of less than 500 microns, and another material held in said structure, wherein said another material is selected from the group consisting of a solid selected from the group consisting of a polymer material, a ceramic material, a metal and carbon and a liquid selected from the group consisting of an electrolyte and liquid crystals, said first organic material having a number-average molecular weight of at least 20,000 and being formed of a hard block and a soft block, said hard block having a crystalline structure and an aggregate structure and the soft block having an amorphous structure, said first organic material being at least one material selected from the group consisting of a block copolymer of polyethylene and an ethylene-styrene random copolymer which is obtained by hydrogenating a block copolymer of polybutadiene and polystyrene random copolymer; a block copolymer of polybutadiene and polystyrene; and a block copolymer of polyethylene and polystyrene which is obtained by hydrogenating a block copolymer of polybutadiene and polystyrene, said network skeleton having a porosity of more than 70%.

* * * * *